(12) United States Patent
Zhang et al.

(10) Patent No.: US 8,519,888 B2
(45) Date of Patent: Aug. 27, 2013

(54) WIRELESS MULTICASTING WITH BEAMFORMING ANTENNAS

(75) Inventors: Honghai Zhang, Ewing, NJ (US);
Yuanxi Jiang, Anhui (CN);
Karthikeyan Sundaresan, Howell, NJ (US); Sampath Rangarajan,
Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 165 days.

(21) Appl. No.: 13/046,230

(22) Filed: Mar. 11, 2011

(65) Prior Publication Data
US 2011/0279321 A1    Nov. 17, 2011

Related U.S. Application Data

(60) Provisional application No. 61/312,910, filed on Mar. 11, 2010, provisional application No. 61/450,901, filed on Mar. 9, 2011.

(51) Int. Cl.
*H01Q 3/00* (2006.01)
(52) U.S. Cl.
USPC .................................. 342/372; 342/373
(58) Field of Classification Search
USPC .............. 342/368, 372, 373, 375; 455/562.1; 370/312, 336
See application file for complete search history.

(56) References Cited

U.S. PATENT DOCUMENTS

2010/0238851 A1*   9/2010   Sundaresan et al. .......... 370/312

\* cited by examiner

*Primary Examiner* — Dao Phan
(74) *Attorney, Agent, or Firm* — Joseph Kolodka

(57) ABSTRACT

A method for wireless multicasting with beamforming includes dividing single lobe beam patterns into groups, each group being a composite beam pattern, the dividing being according to one of an equal power partition configuration and an asymmetric power partition configuration; and transmitting the information with the composite beam pattern.

18 Claims, 5 Drawing Sheets

| Variables in beam multicast | Variables in GCVS-BP |
|---|---|
| beam SNR $\gamma_i$ | object size $s_i = 1/\gamma_i$ |
| SNR threshold $\bar{\gamma}_m$ of MCS m | bin size $b_m = 1/\bar{\gamma}_m$ |
| Rate $R_m$ of MCS m | bin cost $c_m = W + L/R_m$ |
| Aggregate delay $\sum_{g=1}^{G}(W+\dfrac{L}{R_{m(g)}})$ | Total cost $\sum_{g=1}^{G}(W+\dfrac{L}{R_{m(g)}})$ |

WIRELESS MULTICASTING WITH BEAMFORMING ANTENNAS

This application claims the benefit of U.S. Provisional Application No. 61/312,910, entitled "Wireless Multicasting with Switched Beamforming Antennas", filed on Mar. 11, 2010, U.S. Provisional Application No. 61/450,901, entitled "SVC-Based Multicast Streaming with Beamforming Antennas", filed Mar. 9, 2011, and this application is related to U.S. patent application Ser. No. 13/046,258, entitled "Scalable Video Multicast with Non-Overlapping Beamforming Antennas", filed Mar. 11, 2011, all of which whose contents are incorporated by reference herein.

FIELD OF THE INVENTION

The present invention relates generally to wireless communications, and more particularly, to wireless multicasting with beamforming antennas.

BACKGROUND OF THE INVENTION

Wireless multicast/broadcast is becoming increasingly important for efficient dissemination of streaming video as well as common data because the shared nature of wireless medium provides a natural support of wireless multicast and broadcast. However, one limitation of the wireless multicast is that the multicast transmission rate is limited by the mobile terminal with the lowest signal strength in the multicast group.

Beamforming antennas have been widely used to boost the received signal strength in unicast scenarios by concentrating the signal energy in a specific direction at a client. If beamforming can be applied to boost the received power at the weakest client of a multicast group, it can potentially improve the performance of wireless multicast significantly. Nevertheless, it is challenging to apply beamforming technologies to multicast/broadcast transmissions because there is an inherent tradeoff between multicasting and beamforming. While beamforming increases the signal energy on a particular direction, it also reduces the energy on other directions, thereby restricting the wireless broadcast advantage.

An attempt has been made to address the integrated issue of multicasting and beamforming by using a combination of an omni-directional transmission in a first step, followed by one or more multiple single-lobe beamforming transmission in the second step to cover the clients left behind from the omni-directional transmission.

There has been provided a rigorous formulation of the switched beamforming multicasting problem as dividing the beam patterns into multiple partition/group and then sequentially transmitting each group of beam patterns. The objective of this formulation is to minimize the total transmission delay. Two power allocation problems have also been considered: an Equal power EQP model, where the power is evenly distributed among different beams in a given group, and an Asymmetric Power ASP model, where the power distribution across different beams is asymmetric and can be optimally chosen to maximize the minimum SNR in each beam. Also considered were two cases in each model depending on whether the rate is a continuous or discrete function of the SNR values and provide processes for all cases. However, these prior attempts, dividing beam patterns into groups and determining the weight of each antenna for the transmission to the group, need improved efficiency and better performance techniques for dividing the user groups.

Accordingly, there is a need for improved multicasting with beamforming antennas.

SUMMARY OF THE INVENTION

In one aspect of the invention, a method for wireless multicasting with beamforming includes dividing single lobe beam patterns of information into groups, each group being a composite beam pattern, the dividing being according to one of an equal power partition configuration and an asymmetric power partition configuration; and transmitting the information with the composite beam pattern. In a preferred embodiment, the equal power partition configuration includes obtaining an aggregate delay of first sorted beams responsive to an iterative determination, and sorting the beam patterns in decreasing order of their effective signal-to-noise-ratios (SNR), where the effective SNR of a beam pattern refers to the SNR of the worst user under that beam when all power is applied to the beam. Assume that $(\sigma 1, \sigma 2, \ldots, \sigma K)$ is the list of beams sorted in the decreasing order of their effective SNRs. Preferably, the equal power partition model includes determining an initial condition $S1=T(\{\sigma 1\})$ and letting $k=2$, with Sk being the cost and being recursively computed as $S_k=\min_{1 \leq j \leq k}(S_{j-1}+T(\{\sigma_j, \ldots, \sigma_k\}))$, $T(\{\sigma j+1, \ldots, \sigma k\})$ being the transmission delay of the last group and being calculated using the following relationship $$T(\{\sigma_{j+1}, \ldots, \sigma_k\}) = W + \frac{L}{R(\gamma_{\sigma_k}/(k-j))},$$

with W being the switching delay, L being a packet length, $\gamma_{\sigma_k}$ being an effective SNR of beam $\sigma_k$, and R being an SNR-rate table.

In an alternative aspect of the invention, an apparatus for wireless multicasting with beamforming includes means for dividing single lobe beam patterns of information into groups, each group being a composite beam pattern, the dividing being responsive to one of an equal power partition configuration and an asymmetric power partition configuration; and means for transmitting the information with the composite beam pattern responsive to the means for dividing.

BRIEF DESCRIPTION OF DRAWINGS

These and other advantages of the invention will be apparent to those of ordinary skill in the art by reference to the following detailed description and the accompanying drawings.

DETAILED DESCRIPTION

Figure 3:
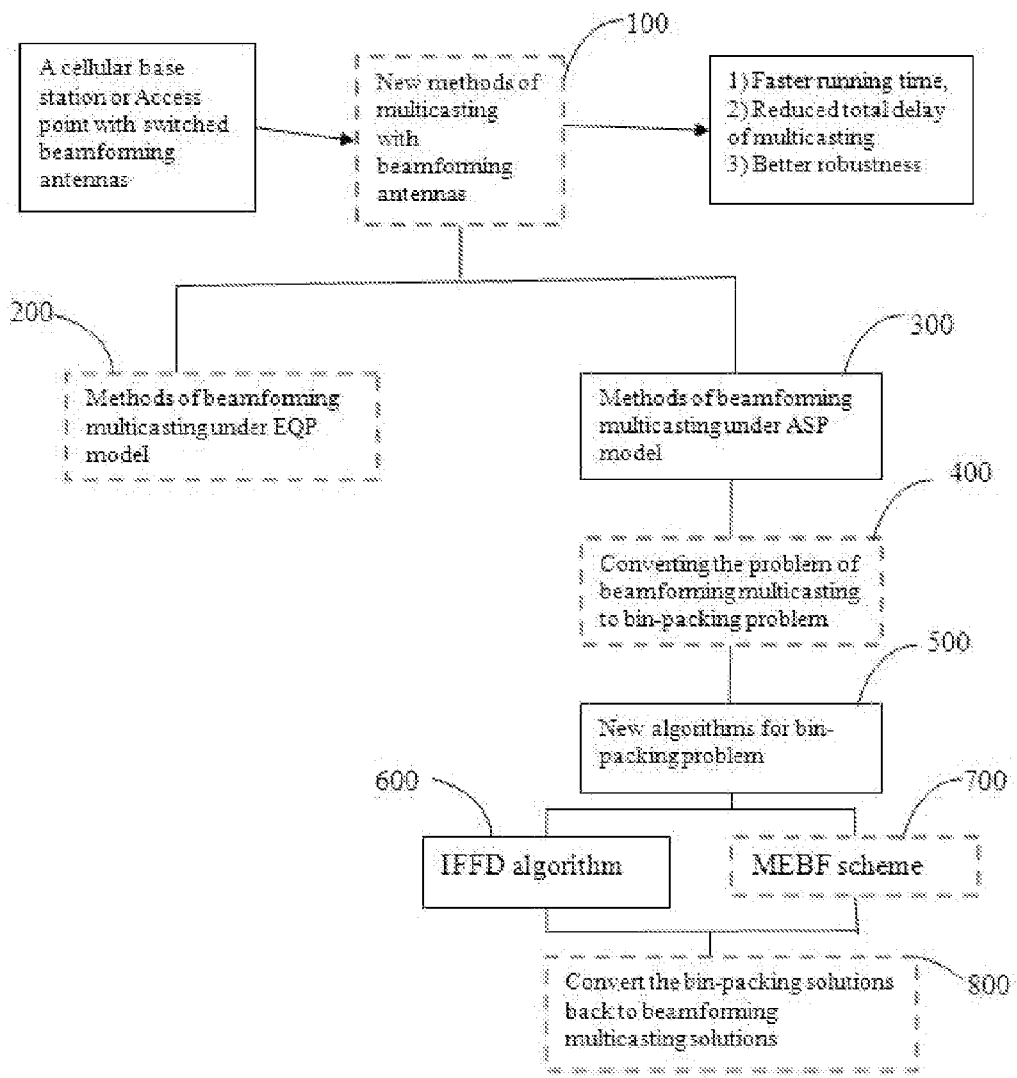
FIG. 3 is a diagram of the inventive multicasting with beamforming, in accordance with the invention.

The invention is directed to the problem of wireless multicasting with switched beamforming antennas, 100 in FIG. 3. In order to exploit both the wireless broadcast advantage and beamforming technologies, the invention divides the single-lobe beam patterns into one or multiple groups and lets each composite pattern comprise a group's single-lobe beam patterns. Then, the same data is transmitted to each composite pattern sequentially. The major issue of how to divide the single-lobe beam patterns into groups, and how to determine the weight/power of each single-lobe beam pattern in a composite one is addressed as follows: Under the EQP (equal power partition) model, the invention develops a dynamic-programming based optimal solution and under the ASP (asymmetric power partition) model, the invention converts the problem to a generalized bin-packing problem and then obtains several approximation solutions. The inventive technique leads to 1) reduced transmission time for a given multicast transmission data, 2) reduced total delay of multicasting and better robustness and 3) improved robustness of system (see FIG. 3).

Figure 1:
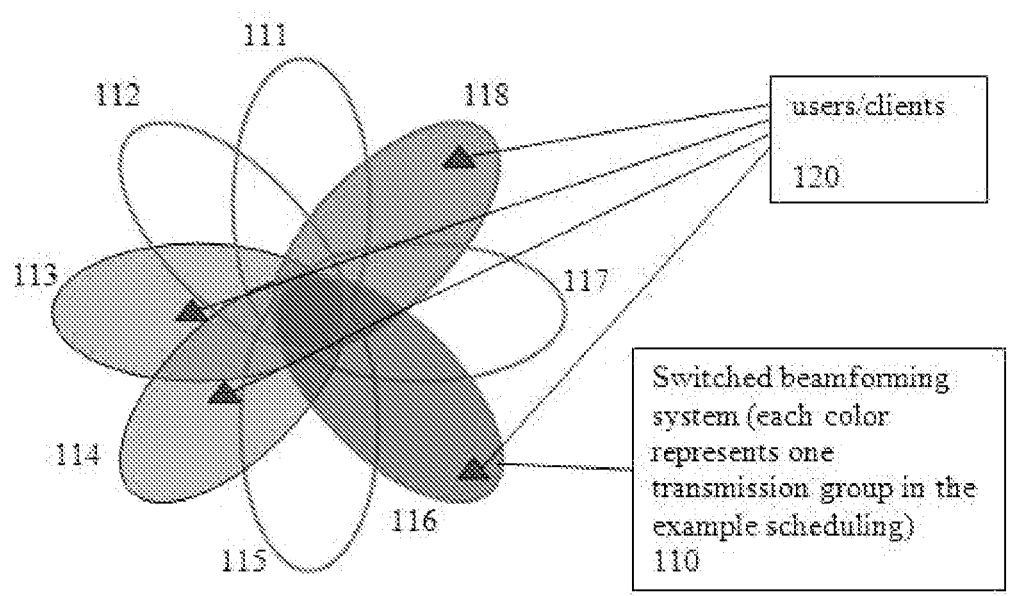
FIG. 1 is an exemplary diagram illustrating a switched beamforming system, in accordance with the invention.
Figure 2:
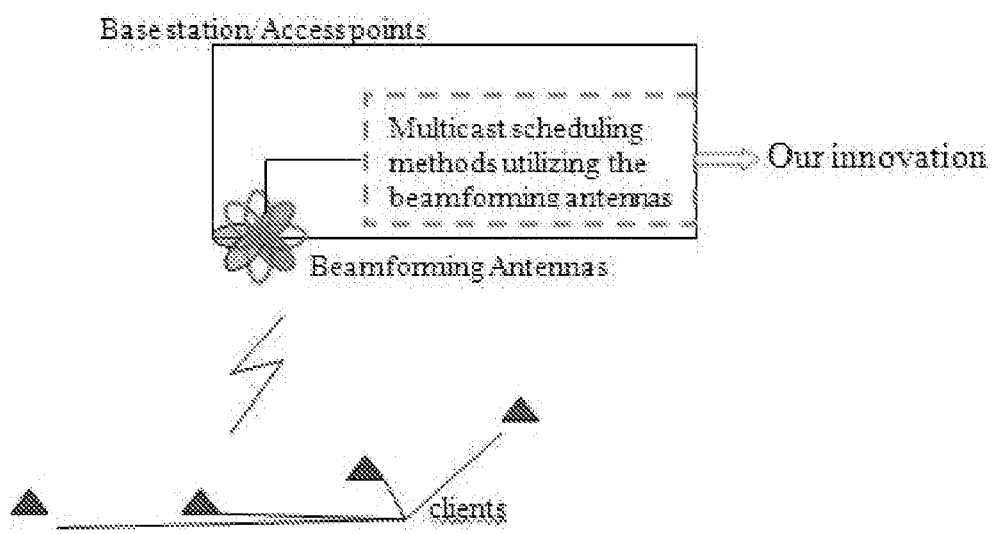
FIG. 2 is an exemplary diagram illustrating a wireless system overview of multicast scheduling utilizing beamforming antennas, in accordance with the invention.

In order to exploit both the wireless broadcast advantage and beamforming technologies, the invention employs new methods for scheduling beamforming transmissions for multicast traffic 100. The basic idea is to divide the (single-lobe) beam patterns into groups where each group represents a composite beam pattern and the same data is transmitted with each composite beam pattern sequentially. For example, referring FIG. 1 and FIG. 2, there are 4 users 120 (clients) in beam patterns 113, 114, 116, 118, respectively. Remaining beam patterns 111, 112, 117 and 118 have no users. Each color representing one transmission group in the example scheduling.

In order to multicast a data to all these users, one possible transmission strategy is to divide the four (single-lobe) beam patterns into 3 groups, wherein the first group comprises beams 113 and 114, the second one comprises 116, and the third one comprises 118. Then the base station (Access point) transmits the same data to the first group using a composite beam pattern combining patterns 113 and 114, then to the second group (beam pattern 116) and then to the third group (beam pattern 118). The data rate for each transmission group may be different to minimize the total transmission delay.

The major issue that needs to be solved is how to divide the beam patterns as well as how to assign the weight/power on each beam within a transmission group. The objective is to minimize the total transmission time of L bytes of data, i.e., minimize $$\sum_{g=1}^{G}\left(W+\frac{L}{R_g}\right),$$

where G is the total number beam groups (to be optimized), W is the switching delay, L is the packet size, $R_g$ is the optimal transmission rate of group g.

Within each group, the transmit power on each single-lobe pattern may be equal or different, which results in two different models: EQP (Equal power partition) model 200 and ASP (Asymmetric power partition) model 300, respectively.

Under the EQP model 200, the transmit power on each single-lobe beam pattern is equal. If the total transmit power is P and there are K single-lobe patterns in a group, each single-lobe pattern receives a power of P/K. The proposed method of beamforming multicasting under EQP is optimal and is based on dynamic programming.

The dynamic programming method relies on the following recursive equations. Assume that (σ1, σ2, ..., σK) is the list of beams sorted in the decreasing order of their effective SNRs, where the effective SNR of a beam is the SNR of the user with the worst channel condition under that beam when all power is applied to the beam. Denote $S_k$ as the cost (i.e., total transmission time) of the optimal partition of beams (σ1, σ2, ..., σK). $S_k$ can be recursively computed as $$S_k = \min_{1 \leq j \leq k}(S_{j-1}+T(\{\sigma_j, \ldots, \sigma_k\}))  \quad (1)$$

where T ({σj+1, ..., σk}) is the transmission delay of the last group and is calculated using Eq. (2):

$$T(\{\sigma_{j+1}, \ldots, \sigma_k\}) = W + \frac{L}{R(\gamma_{\sigma_k}/(k-j))} \quad (2)$$

where W is the switching delay, L is the packet length, $\gamma_{\sigma_k}$ is the effective SNR of beam σk, R is the snr-rate table. The initial condition is $$S1 = T(\{\sigma1\}) \quad (3)$$

Figure 4:
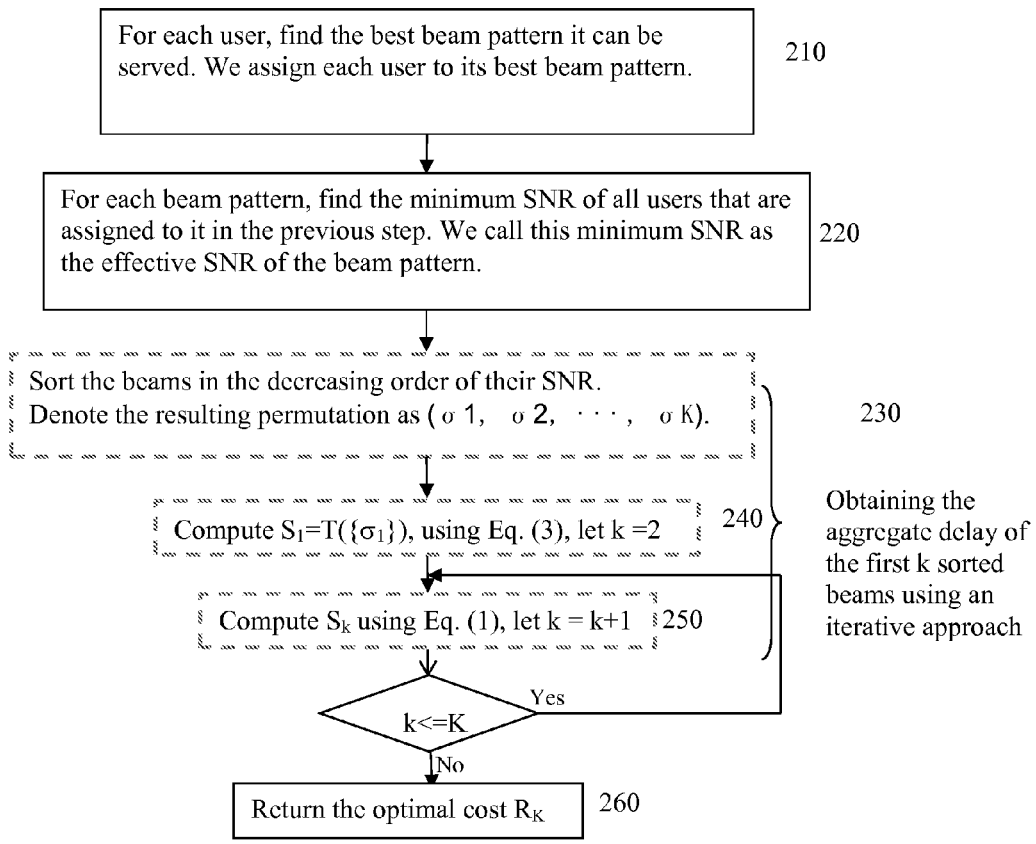
FIG. 4 is a diagram of beamforming multicasting under an Equal Power Partition EQP model, in accordance with the invention.

The blocks of FIG. 4 show the detailed inventive steps under the EQP model 200. For each user, find the best beam pattern that can be served and assign each user to its best beam pattern. See 210. For each beam pattern, find the minimum SNR signal-to-noise-ratio of all users that are assigned to it in the previous step. This is referred to as the minimum SNR as the effective SNR of the beam pattern. See 220. Sort the beams in the decreasing order of their SNR. Denoting the resulting permutations as (σ1, σ2, ..., σK). See 230. Then Compute $S_1 = T(\{\sigma_1\})$, using Eq. (3), let k=2. See 240. Compute $S_k$ using Eq. (1), let k=k+1. See 250. $S_k$ is computed for K iterations to return the optimal cost $R_K$. See 260.

Under the ASP (Asymmetric Power Splitting) model 300, each beam may be assigned with a different power to minimize the total transmission delay. In order to solve the problem, the invention first converts the problem to a generalized-cost-variable-size bin-packing (GCVS-BP) problem 400. The invention then applies existing processes and also employs new processes 500, 600, 700 to solve the GCVS-BP problem. The high level flow diagram is depicted in FIG. 5.

Figure 5:
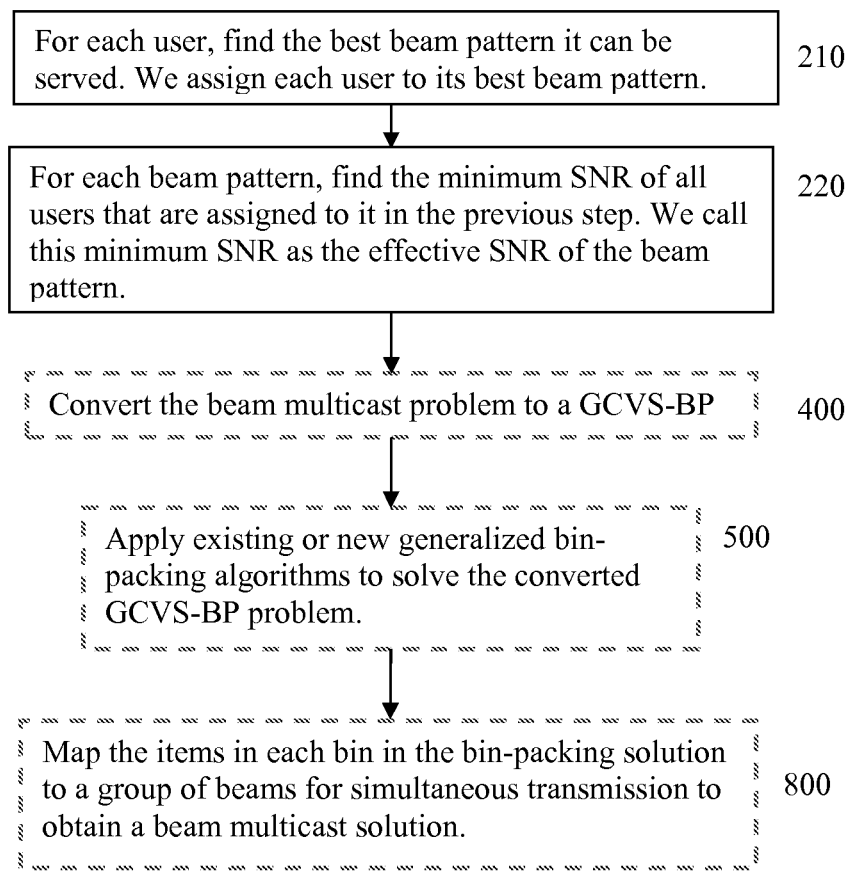
FIG. 5 is a diagram of beamforming multicasting under an Asymmetric Power Partition ASP model, in accordance with the invention.

The high level flow diagram for conversion of the beamforming problem into a bin packing problem under the ASP model is depicted in FIG. 5. For each user, find the best beam pattern it can be served. The process assigns each user to its best beam pattern. See 210. For each beam pattern, find the minimum SNR of all users that are assigned to it in the previous step. We call this minimum SNR as the effective SNR of the beam pattern. See 220. Convert the beam multicast problem to a GCVS-BP problem. See 400. Apply existing or new generalized bin-packing algorithms to solve the converted GCVS-BP. See 500. Map the items in each bin in the bin-packing solution to a group of beams for simultaneous transmission to obtain a beam multicast solution. See 800.

Figures 6, 7:
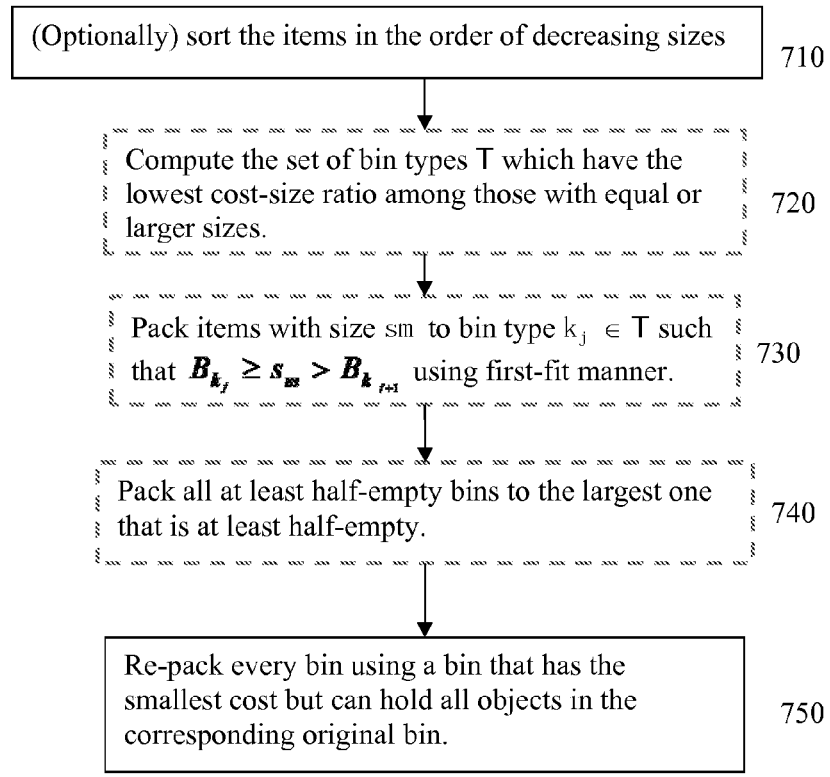
FIG. 6 is a mapping table for conversion of the beam partition problem to a generalized-cost-variable-size bin packing (GVCS-BP) problem, in accordance with the invention.
FIG. 7 is diagram of a Most Efficient Bins First MEBF technique, in accordance with the invention.

Conversion of the multicast problem to a GCVS-BP problem is accomplished by applying the mapping depicted in FIG. 6. Shown in the mapping table are variables in a beam multicast situation converted to variables in the GCVS-BP situation.

The inventive process applies a known algorithm IFFD 600 to solve the converted GCVS-BP problem 500. The process also employs an inventive MEBF (Most Efficient Bins First) technique to solve the problem. The inventive MEBF technique 700 is illustrated in the diagram of FIG. 7. Optionally, the process sorts the items in the order of decreasing sizes. See 710. Then the process computes the set of bin types T which have the lowest cost-size ratio among those with equal or larger sizes. See 720. The process then packs items with size $s_m$ to bin type $k_j \in T$ such that $B_{k_j} \geq s_m > B_{k_{j+1}}$ using a first-fit manner. See 730. The process packs all at least half-empty bins to the largest one that is at least half-empty. See 740. The process then re-packs every bin using a bin that has the smallest cost but can hold all objects in the corresponding original bin. See 750. Lastly, the process converts the bin-packing solution back to a solution for multicasting scheduling with beamforming antennas. See 800.

It is anticipated, however, that departures may be made therefrom and that obvious modifications will be implemented by those skilled in the art. It will be appreciated that those skilled in the art will be able to devise numerous arrangements and variations, which although not explicitly shown or described herein, embody the principles of the invention and are within their spirit and scope.

What is claimed is:

1. A method for wireless multicasting with beamforming comprising the steps of:
   dividing single lobe beam patterns of information into groups, each said group being a composite beam pattern, said dividing being according to one of an equal power partition configuration and an asymmetric power partition configuration; and
   transmitting said information with said composite beam pattern responsive to said step of dividing,
   wherein said asymmetric power partition comprises a generalized-cost-variable-size bin-packing (GCVS-BP) conversion responsive to a multicast of said beam patterns and said GCVS-BP is responsive to a generalized bin-packing configuration.

2. The method of claim 1, wherein said equal power partition configuration comprises obtaining an aggregate delay of first sorted beams responsive to an iterative determination.

3. The method of claim 1, wherein said equal power partition configuration comprises sorting said beam patterns in decreasing order of their signal-to-noise-ratio.

4. The method of claim 1, wherein said equal power partition model comprises determining an initial condition initial $S1=T(\{\sigma 1\})$ and letting k=2, with Sk being cost and recursively computed as $S_k = \min_{1 \leq j \leq k}(S_{j-1} + T(\{\sigma_j, \ldots, \sigma_k\}))$, $T(\{\sigma j+1, \ldots, \sigma k\})$ being a transmission delay of a last group and being determined responsive to $$T(\{\sigma_{j+1}, \ldots, \sigma_k\}) = W + \frac{L}{R(\gamma_{\sigma_k}/(k-j))},$$

with W being a switching delay, L being a packet length, $\gamma_{\sigma k}$ being an effective SNR of beam σk, and R being an SNR-rate table.

5. The method of claim 1, wherein said equal power configuration comprises determining a cost of total transmission time of an optimal partition of beams responsive to the relationship $S_k = \min_{1 \leq j \leq k}(S_{j-1} + T(\{\sigma_j, \ldots, \sigma_k\}))$ and letting k=k+1, with $T(\{\sigma j+1, \ldots, \sigma k\})$ being a transmission delay of the last group.

6. The method of claim 1, wherein said asymmetric power partition configuration comprises converting a multicast of said beam patterns to a generalized-cost-variable-size bin-packing (GCVS-BP) configuration.

7. The method of claim 1, wherein said generalized bin-packing configuration comprises mapping items in each bin in said bin-packing configuration to a group of said beams for simultaneous transmission to obtain a multicast transmission of said beam.

8. The method of claim 1, wherein said asymmetric power partition configuration comprises mapping variables in a multicast of said beam to variables in a generalized-cost-variable-size bin-packing (GCVS-BP), respectively, said mapping comprising at least one of a) beam signal-to-noise-ratio SNR to object size; b) SNR of modulated coding scheme MCS to bin size; c) rate of MCS to bin cost; and d) aggregate delay to total cost.

9. The method of claim 1, wherein said asymmetric power partition configuration comprises converting a multicast of said beam patterns to a generalized-cost-variable-size bin-packing (GCVS-BP) configuration responsive to a most efficient bins first selection.

10. The method of claim 9, wherein said most efficient bins first selection comprises determining a set of bin types which have the lowest cost size ratio among those with equal or larger sizes.

11. The method of claim 9, wherein said most efficient bins first selection comprises packing items with size to bin type such that $B_{k_j} \geq S_m > B_{k_{j+1}}$ using a first-fit manner.

12. The method of claim 9, wherein said most efficient bins first selection comprises packing all at least half-empty bins to the largest one that is at least half-empty.

13. An apparatus for wireless multicasting with beamforming comprising:
   means for dividing single lobe beam patterns of information into groups, each said group being a composite beam pattern, said dividing being responsive to one of an equal power partition configuration and an asymmetric power partition configuration; and
   means for transmitting said information with said composite beam pattern responsive to said means for dividing,
   wherein said asymmetric power partition comprises a generalized-cost-variable-size bin-packing (GCVS-BP) conversion responsive to a multicast of said beam patterns and said GCVS-BP is responsive to a generalized bin-packing configuration.

14. The apparatus of claim 13, wherein said equal power partition configuration comprises obtaining an aggregate delay of first sorted beams responsive to an iterative determination.

15. The apparatus of claim 13, wherein said equal power partition configuration comprises sorting said beam patterns in decreasing order of their signal-to-noise-ratio.

16. The apparatus of claim 13, wherein said equal power partition model comprises determining an initial condition initial $S1=T(\{\sigma 1\})$ and letting k=2, with Sk being cost and recursively computed as $S_{k=min 1 \leq j \leq k}(S_{1\_} + T(\{\sigma_j, \ldots, \sigma_k\}))$, $T(\{\sigma j+1, \ldots, \sigma k\})$ being a transmission delay of a last group and being determined responsive to $$T(\{\sigma_{j+1}, \ldots, \sigma_k\}) = W + \frac{L}{R(\gamma_{\sigma_k}/(k-j))},$$

with W being a switching delay, L being a packet length, $\gamma_{\sigma_k}$ being an effective SNR of beam σk, and R being an SNR-rate table.

17. The apparatus of claim 13, wherein said equal power configuration comprises determining a cost of total transmission time of an optimal partition of beams responsive to the relationship $S_k = \min_{1 \leq j \leq k}(S_{j-1} + T(\{\sigma_j, \ldots, \sigma_k\}))$ and letting k=k+1, with $T(\{\sigma j+1, \ldots, \sigma k\})$ being a transmission delay of the last group.

18. The apparatus of claim 13, wherein said asymmetric power partition configuration comprises converting a multicast of said beam patterns to a generalized-cost-variable-size bin-packing (GCVS-BP) configuration.

* * * * *